Sept. 1, 1953          A. M. COHEN          2,650,957
FINGER TYPE CIRCUIT REGULATOR AND CONTACT ASSEMBLY THEREFOR
Filed Sept. 17, 1948          3 Sheets-Sheet 3
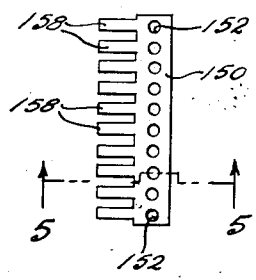
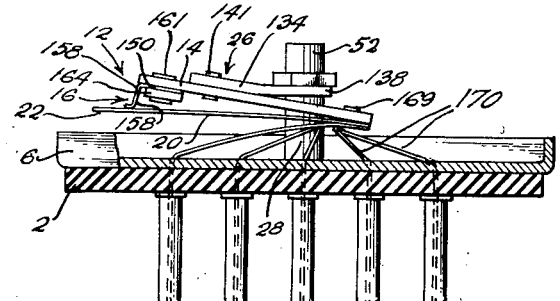
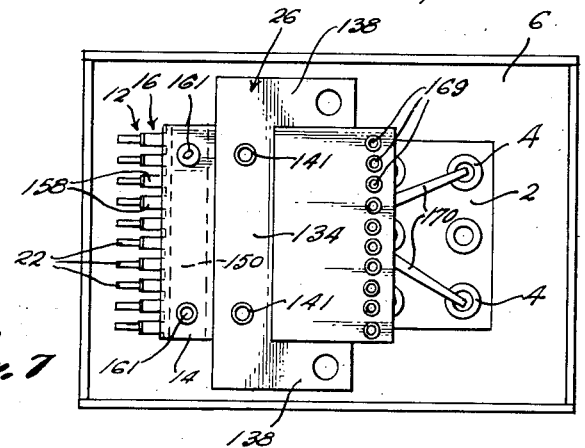
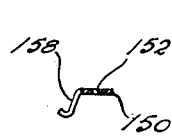
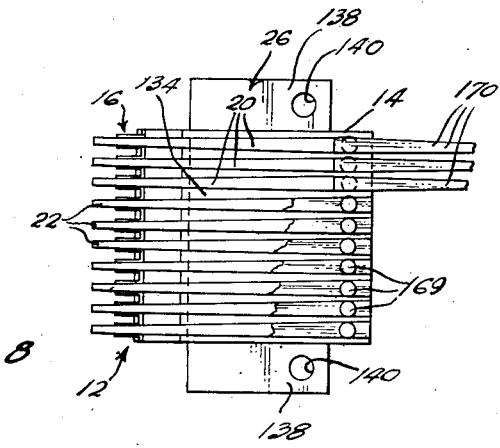
INVENTOR.
ARTHUR M. COHEN
BY
James and Franklin
ATTORNEYS.

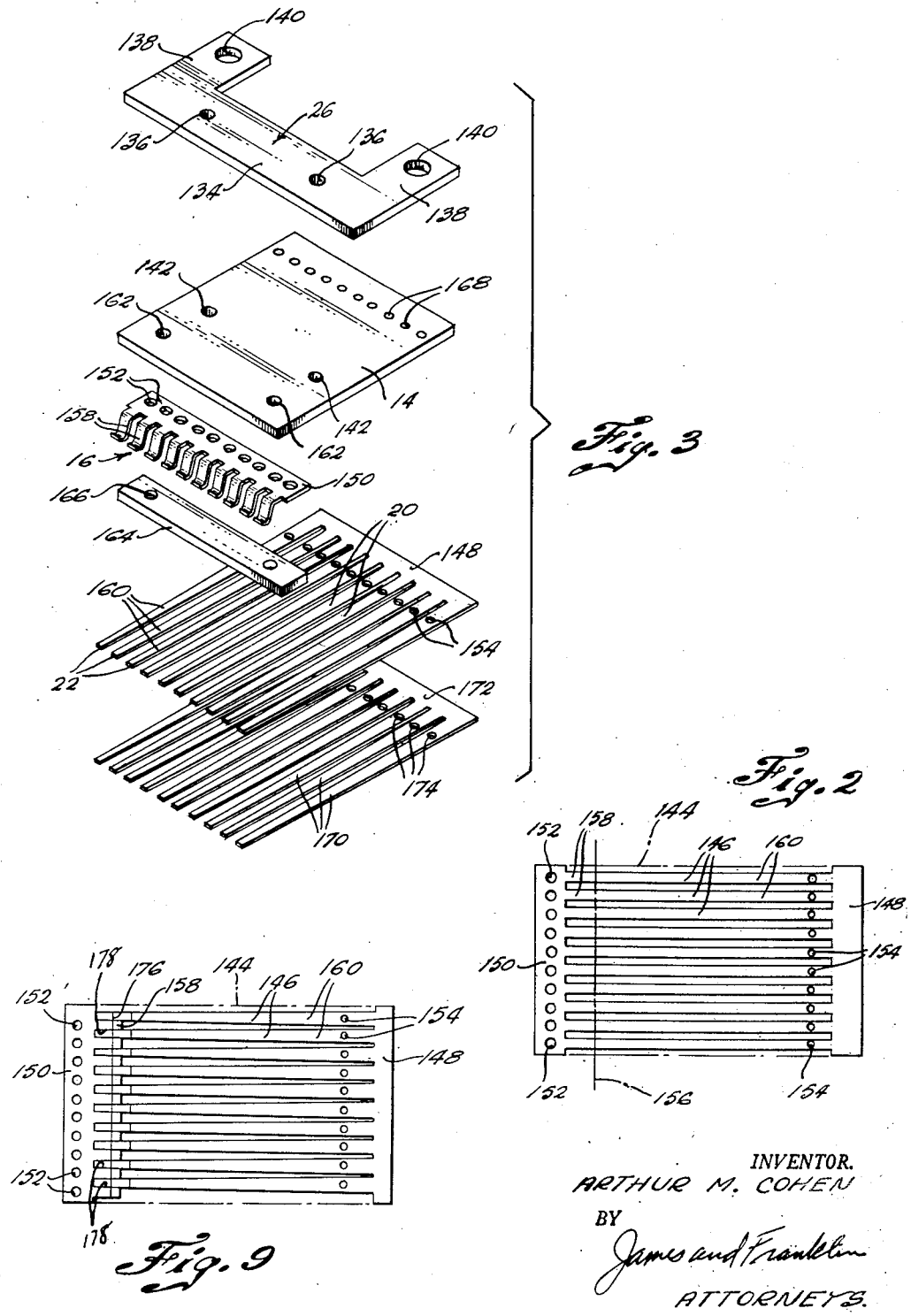

Patented Sept. 1, 1953

2,650,957

UNITED STATES PATENT OFFICE 2,650,957

FINGER TYPE CIRCUIT REGULATOR AND CONTACT ASSEMBLY THEREFOR

Arthur M. Cohen, New York, N. Y.

Application September 17, 1948, Serial No. 49,726

15 Claims. (Cl. 200—1)

The present invention relates to a novel construction of a finger type circuit regulator and has particular reference to the contact assembly therefor and to a novel method of making such a contact assembly.

Circuit regulators, and particularly those of the type known as voltage regulators, have in the past taken a large number of forms. The present invention relates to that type of regulator commonly known as the "finger type" by reason of the fact that it employs a plurality of movable fingers each normally urged into electrical connection with corresponding fixed contacts so as to vary the circuit constants of the circuit with which the regulator is associated. Finger type regulators as heretofore known have suffered from the disadvantage that they were either exceedingly large and heavy or else were highly susceptible to derangement and malfunctioning because of vibrations or the position in which they were placed. In addition, those finger regulators which were not of relatively massive proportions were extremely fragile and hence quite undependable. As a result, the utilization of finger type regulators has lagged considerably behind regulators of other types. This has been particularly true in military installations where dependability under all sorts of climatic conditions and under extreme vibratory conditions, such as are experienced in tanks and aircraft, is a prime requisite. In addition, size and weight considerations are of extreme importance particularly insofar as portable and aircraft installations are concerned. No finger type regulator has in the past been able to satisfy military requirements and the size and weight of prior art finger type regulators as used in industrial applications have made the units so expensive that they could not economically compete with alternative devices.

By means of an extensive redesign of finger type regulators, I have produced a unit which is of exceedingly small size yet which will operate accurately no matter in what position it may be placed nor to what accelerative forces it may be subjected, and which exhibits outstanding resistance to vibration. My entire unit may be encompassed in a housing 1⅝ inches high, 1⅞ inches long and 1⅜ inches wide. The inherent accuracy of my device is so great, even when subjected to greatly diverse climatic conditions and to extreme vibratory action, that it has successfully passed all of the tests prescribed by the United States Army Air Forces and the United States Army Signal Corps for circuit regulators, and in passing them has performed better than non-finger type regulators formerly used for the same purpose. My device is the first finger type regulator capable of satisfying these requirements. Orders for substantial numbers of my regulators have already been made by the Armed Forces.

The greatly improved operation of my device is due to a number of specific design features which depart radically from similar prior art devices. This application relates specifically to the contact assembly of the regulator, to the means by which electrical connections are made to the fixed and movable contacts of said contact assembly, to the incorporation of such a contact assembly in a plug-in device, and to a novel method of making such a contact assembly. Other novel features of my regulator shown but not claimed herein are claimed in my copending application, Serial No. 34,517, filed June 22, 1948, now Patent No. 2,580,732, issued January 1, 1952, and entitled Finger Type Circuit Regulator.

A large number of circuit connections must be made in conjunction with the use of a finger type regulator since normally one set of contacts, either the fixed contacts or the movable contacts, must be provided with a common lead, and each individual contact of the other set of contacts must be provided with its own individual lead. In finger type regulators as they have existed prior to my invention, binding posts and/or soldered connections have been employed. In view of the large size and weight of such regulators, this method of connection did not add materially to their bulk nor were precise manipulations required, and, in view of the expensiveness of such regulators, the hand operations required to make the soldered or other type connections, and the time consumed in so doing, did not add materially to their cost. However, since lightness and small size has been of prime importance in my regulator, and since those are fundamental distinguishing features and advantages of my regulator, binding posts were completely out of the question and the use of soldered connections, while feasible, nevertheless were impractical from an economic and production point of view, both because the small size of my regulator made soldering of individual leads a precision matter and because of low cost of my regulator made any additional production expenses a significant factor percentagewise.

In addition, by reason of the compactness and small size of my regulator, it has been found feasible to employ resilient fingers stamped from thin sheet metal stock as the movable contacts. This has materially contributed to the vibration resistance of my unit, since the resonant frequency of fingers so constructed is very high, and has also, because each of these fingers had to be individually secured to a mounting plate, usually by means of individual rivets or eyelets, made feasible the use of a novel type of electrical connector and novel method of securing the connectors to the fingers.

It is a prime object of the present invention to construct a contact assembly in which the contacts are individually secured to a mounting plate and in which the electrical connections to said contact are secured thereto in the same manner and by the same means, and at the same time during assembly, as the contacts are secured to the mounting plate.

In achieving the above prime object, I have employed, in place of the conventional wire connectors, a plurality of sheet metal connectors which are similar in construction, at least in part, to the resilient fingers themselves and which may be secured to the resilient fingers by the very same eyelet or rivet which secures the resilient fingers to the mounting plate.

In the course of development of the design of my regulator, it was discovered that calibration of individual regulators made on a mass production basis was an exceedingly delicate task. It was also discovered that, for special applications, special spacings of the contacts were found necessary in order to provide for desired intervals between the opening and closing of adjacent contact pairs.

It is another prime object of the present invention, in order to provide for ready calibration and ready adaptation to specific installations, to employ, in conjunction with movable finger contacts, fixed contacts which are capable of being manually bent so as to vary the relative positions of the adjacent contact pairs.

In the accomplishment of the above prime object it was found most desirable to form the fixed contacts from the same type of resilient sheet material as the movable fingers themselves were formed, both the fixed contacts and the movable contacts being stamped from that sheet in the form of a comb.

It is another object of the present invention to devise a novel method for the fabrication of contact assemblies in which all the contacts are formed from sheet stock, whereby both the fixed and movable contacts are simultaneously formed from a single sheet of metal and are then separated from one another in the form of combs defined by fingers and a connecting portion.

It is yet another object of the present invention to form the leads through which electrical connection is made to the contacts by stamping said leads from a sheet of suitable material, also in the form of a comb.

It was found that the comb structure possessed many advantages. It provided for ready manipulation of the fingers and for easy formability thereof into desired shapes, made practical the simultaneous fastening of large number of contacts to the mounting plate, and made it a very simple matter to provide either for electrical interconnection or electrical separation between adjacent contacts.

It is a further object of the present invention to devise a contact assembly construction and a method of making the same in which the individual contacts are secured together and simultaneously attached to a mounting plate, after which, by means of a simple cutting operation, they are rendered electrically and physically separated.

Still another object of the present invention is to devise a plug-in type regulator having the advantages set forth above.

To the accomplishment of the above objects and such other objects as may hereinafter appear, the present invention relates to the construction of a finger type circuit regulator, to the construction of the contact assembly therefor, and to a method for making said contact assembly all as defined in the appended claims and as set forth in this specification, taken together with the accompanying drawings, in which:

Fig. 2 is a view showing the first stage in one method of fabrication of the contact pieces thereof;

Fig. 3 is an exploded view of the portions of the contact assembly;

Fig. 4 is a top view of the fixed contact portion thereof in the form of a flat comb;

Fig. 5 is a side cross-sectional view taken along the line 5—5 of Fig. 4, showing the contacts after they have been bent to shape;

Fig. 6 is a side view of the contact assembly in position on the regulator;

Fig. 7 is a top view thereof with the spacers removed;

Fig. 8 is a bottom view of the contact assembly itself showing the manner in which the flexible conductive strips are employed; and Fig. 9 is a view similar to Fig. 2 but showing the first stage in an alternative method of fabrication of the contact pieces.

Figure 1:
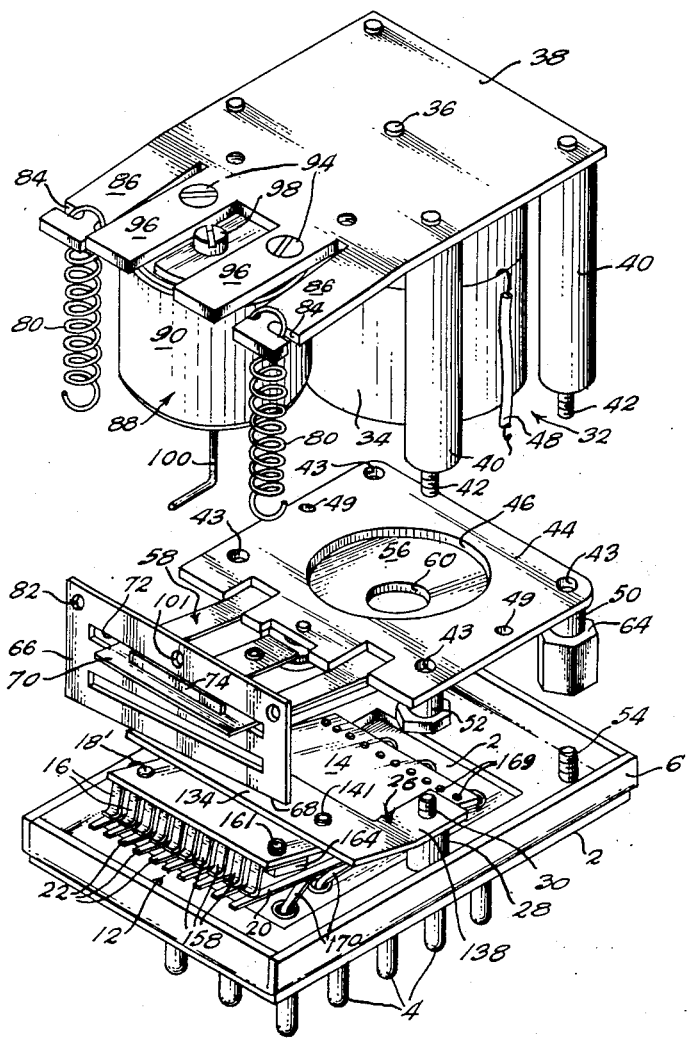
Fig. 1 is an exploded perspective view of the circuit regulator of the present invention.

The regulator here disclosed comprises an insulating plate 2 formed of any suitable insulating material, from which connection prongs 4 depend, so that the entire unit is adapted to be plugged into a suitable socket. A metal plate 6 is secured to the insulating base 2 in any suitable manner and a casing, omitted from the drawings for purposes of clarity, is adapted to be secured to the plate 6 so as to enclose the entire assembly. The electromagnet generally designated 32 which defines the armature moving mechanism comprises an energizing coil 34 mounted between magnetizable top plate 38 and a bottom plate 44 with magnetizable spacers 40 between said plates. A core 36, the upper end of which is visible in Fig. 1 and by which the core is secured to the top plate 38, projects through the coil 34 and through the aperture 46 in the magnet bottom plate 44. The magnetizable spacers 40 have screw threaded projections 42 which pass through apertures 43 in the magnetizable bottom plate 44 and are then received within internally threaded spacers 50 and 52. Leads 48 from the coil 34, which pass through apertures 49 in the bottom plate 44, connect the coil 34 to appropriate prongs 4.

The internally threaded spacers 50 and 52 maintain the electromagnet 32 in assembled position by means of their engagement with the projections 42 of the spacers 40. The spacers 52 are considerably shorter than the spacers 50, the spacers 50 extending between the magnet bottom plate 44 and the plate 6 and being secured in position by means of screws 54 extending through the insulating plate 2. The spacers 52 are positioned below the plate 44 and are engaged by screws 30 projecting through the plate 6.

The armature 56 is in the form of a flat sheet of magnetizable material to the upper surface of which is secured a flexible non-magnetic sheet defining the armature mounting member 58, the mounting member 58 being in turn secured to the magnet bottom plate 44 between said plate 44 and the spacers 52. The armature mounting member 58 is so constructed that the armature 56 is pivotable about an axis parallel to the plane of the lower surface of the magnet bottom plate 44 and parallel to a line between the axes of the spacers 52. The right hand portion of the armature 56, as viewed in Fig. 1, is provided with an aperture 60 arrangeable concentrically with the downwardly projecting portion of the core 36 so that said projecting portion is receivable therein. The left hand portion of the armature 56 extends out beyond the electromagnet 32, and it is to that left hand portion of the armature 56 that the armature mounting member 58 is fastened as by means of rivets. The spacers 50 are provided with shoulders 64 which are adapted to engage with the extreme right hand portion of the armature 56 so as to limit its pivotal motion in a clockwise direction as viewed in Fig. 1.

The finger lifting member 66 is in the form of a sheet of non-conductive material having an inclined lower edge 68. It is mounted substantially perpendicular to the plate 2 and is movable in a direction substantially perpendicular thereto. The extreme left hand portion 70 of the armature mounting member 58 extends out beyond the armature 56 and is receivable in an aperture 72 in the finger lifting member 66 so as to be passable between the upper surface of said aperture 72 and the lug 74 formed therein. The portion 70 of the armature mounting member 58 is provided with an aperture through which the lug 74 is receivable, and by means of this lug and aperture connection the finger lifting member 66 is connected to the armature 56 so as to be pivotable with respect thereto as the armature 56 is pivoted on the magnet bottom plate 44.

In order to ensure that the finger lifting member 66 maintains its proper position, a pair of springs 80 are active thereon, one end of each of the springs being securable in aperture 82 in the member 66 and the other end of the springs being securable in notches 84 in the frame portions 86 which may be integral extensions of the magnet top plate 38.

The dashpot generally designated 88 comprises a cylinder 90 in which a piston is slidable. The dashpot 88 is secured to the unit by means of screws 94 which pass through other frame portions 96, also preferably integral extensions of the magnet top plate 38, these frame portions 96 being separated so as to provide access to the adjusting screw 98 which controls the air escape from the dashpot 88 and hence determines the extent of its damping action. The plunger of the dashpot 88 is secured to the finger lifting member 66 by means of the angular connection 100, here shown as of L-shape, which engages in the aperture 101 of the member 66, in which it may be secured by means of solder.

The contact assembly generally designated 12 and illustrated best in Fig. 3 comprises a plaque or mounting plate 14 which may be secured in any appropriate manner to the U-shaped mounting member 26, that member comprising a body portion 134 having apertures 136 and leg portions 138 with apertures 140. The leg portions 138 are securable between the spacers 52 and the sleeves 28, the screws 30 passing through the sleeves 28 and apertures 140 and being threadedly receivable within the spacers 52 so as to secure the mounting plate 26 in position within the unit. Rivets or eyelets 141 may be provided, passing through the apertures 142 in the mounting plate 14 and through the apertures 136 in the body portions 134 of the mounting member 26, thus securing the mounting plate 14 and the mounting member 26 together.

Fastened to the mounting plate 14 are a plurality of fixed contacts generally designated 16 and a plurality of movable contacts in the form of resilient fingers 20, one for each fixed contact 16. The fingers 20 in the form here described are formed of a resilient material which is a good conductor of electricity. The free ends 22 of the fingers 20 are normally urged into electrical connection with the fixed contacts 16.

Since there are normally as many movable contacts 20 as there are fixed contacts 16, and since the movable contacts 20 are in the form of resilient metal strips, it makes for exceedingly efficient production to simultaneously form both the fixed contacts 16 and the movable contacts 20 from sheet material. This has the added advantage that the fixed contacts 16 are thereby rendered bendable so that adjustment of their position with respect to one another is facilitated, thus making for ease of calibration and adjustment and rendering the finished unit capable of easy adaptation for special uses.

To this end, according to one method a sheet of suitable metal 144 may be stamped or otherwise cut to the outline shown in Fig. 2, that outline including a plurality of strips 146 separated along their length but connected at their extremities by means of connecting portions 148 and 150. For reasons which will become apparent hereafter, the connecting portion 150 is provided with at least a pair of apertures 152 and each of the strips 146, adjacent to but inwardly disposed with respect to the connecting portion 148, is provided with an aperture 154. Thereafter, the thus formed sheet is separated along the dot-dash line 156 so as to define a pair of combs, the first of said combs comprising the lesser portion of the length of the fingers 146 together with the connecting portion 150, and the second of the combs comprising the greater portion of the strips 146 and the connecting portion 148. The portions of the strips 146 in the combs will hereafter be termed fingers 158 and 160 respectively.

An alternative method of forming the combs is disclosed in Fig. 9. There, the sheet of suitable metal 144 is stamped or cut into the outline shown, that outline including a plurality of strips 146 separated along their length but connected at their extremity by means of the connecting portions 148 and 150. It will be noted that the connecting portion 150 of Fig. 9 is substantially wider than the corresponding connecting portion 150 of Fig. 2. The apertures 152 and 154 may be formed in the connecting portions 150 and 148, respectively, in a manner similar to that disclosed in Fig. 2. Thereafter, the thus formed sheet is separated along a plurality of concavities 178 in the connecting portion 150. An examination of Fig. 9 will disclose that these concavities 178 simultaneously define the tips of the strips 146 which form the fingers 160 and at the same time define the fingers 158. An advantage of this method of fabrication is that there is less waste of the material of which the sheet 144 is composed when compared with the method disclosed in Fig. 2. The method of Fig. 9 has additional advantages where it is desired to provide the fingers 158 and 160 with an inlay of more highly conductive or more durable material. In such a case, the sheet 144 may be provided with a continuous strip 176 of such inlay material and it will be apparent that by severing the strip as disclosed in Fig. 9 each of the fingers 160 will be provided with a strip of inlay material slightly inwardly disposed from their tips and at the same time the tips of the fingers 158 will be similarly inlaid. Since, as may be seen in Figs. 1, 7 and 8, the fingers 160 engage the fingers 158 at the tips of the latter but at a point spaced inwardly from the tips of the former, it will be apparent that the inlays provided by the method of Fig. 9 are positioned at exactly the proper points. Only a very small proportion of the relatively expensive inlay material is wasted, while at the same time mass production of the inlaid fingers is facilitated.

The first comb, as shown in Fig. 4, is employed to form the fixed contacts 16. It is subjected to a forming operation, such as may conveniently be performed in a press, so that the fingers 158 are bent downwardly and provided with curved ends. This may best be seen in Fig. 5. Thereafter, the thus formed comb may be secured to the mounting plate 14 in any convenient manner, as by eyelets 161 passing through the apertures 152 in the connecting portion 150 and the apertures 162 in the mounting plate 14. It is usually desired, in order to provide for rigidity of mounting and security of electrical connection, that a conductive plate 164 having apertures 166, which register with the apertures 152 and 162, be fastened by the same eyelets 161 so as to clamp the connecting portion 150 of the first comb between itself and the mounting plate 14. A lead 18' may be soldered or otherwise connected to one of the eyelets 161 and led to an appropriate prong 4, this acting as a common lead to all of the fixed contacts 16.

In order to secure proper operation, it is necessary that, if, as illustrated, all of the fixed contacts 16 are electrically connected together, each of the fingers 160 which define the movable contacts must be electrically separated one from the other. This is easily accomplished by removing the connecting portion 148 from the fingers 160. The apertures 154 and 168 are so positioned that when the fingers 160 are secured to the mounting plate 14 by the eyelets 169, the connecting portion 148 extends out beyond the side of the mounting plate 14. Hence, after each of the fingers 160 have been eyeleted or otherwise secured to the mounting plate 14, the connecting portion 148 can be removed, as by snipping it off with a shears, after which each of the fingers 160 will be physically and electrically separated one from the other (see Fig. 8).

Individual electrical leads must be provided between each of the fingers 160 which define the movable contacts and the appropriate prongs 4 so that proper electrical connection with the external circuit may be made. The conventional manner of accomplishing this is to utilize individual wire segments and to solder one end of each of those segments to each of the contacts 160. As here illustrated, there are ten fingers 160 and hence ten separate soldering operations would have to be performed. Moreover, because of the close spacing between the fingers 160, each soldering operation would require extreme precision, or else solder would run over from one finger 160 to the next and thus destroy the electrical separation which is essential to their proper functioning. Not only is such soldering therefore a hazardous procedure from the point of view of avoiding rejects, but it is also an extremely time consuming procedure requiring the use of skilled personnel and the consumption of relatively expensive materials.

I have found that all of these disadvantages may be avoided by utilizing sheet metal for electrical connectors instead of customary wire material and by initially forming that material as a comb. Such a comb is illustrated at the bottom of Fig. 3 as comprising the fingers 170 and the connecting portion 172, the fingers having apertures 174 similar in placement to the apertures 154 of the second comb. The material of which this third comb is formed should be conductive and flexible but it need not be resilient. A suitable material is soft brass. The fingers 170 at their ends close to the connecting portion 172 are similar in shape to the corresponding ends of the fingers 160 of the second comb, but the fingers 170 may differ from the fingers 160 in that they may be considerably longer. The apertures 174 are adapted to register with the apertures 154 in the fingers 160 and the apertures 168 in the mounting plate 14. When the third comb is employed, it is superimposed on the second comb before the second comb is attached to the mounting plate 14, so that the apertures 174, 154 and 168 are all in registration. A single eyeleting or riveting operation will then serve to secure the fingers 170 to the fingers 160 and to secure both sets of the fingers to the mounting plate 14. Thereafter, the connecting portions 148 and 172 may be simultaneously removed, leaving each of the fingers 170 physically and electrically connected to a finger 160. The fingers 170 of sheet material may then be bent away from the fingers 160, as best shown in Fig. 8, and led into the appropriate prong 4, as best shown in Fig. 6, in which prongs they may be secured in any appropriate manner as by crimping or soldering.

The contact assembly constructed and formed as described above, and the circuit regulator of which that contact assembly is a component part, has many advantages not characteristic of prior art devices. In the first place, by forming the fixed contacts 16 of a bendable material, it is possible to individually bend each of the fixed contacts 16 so as to vary the vertical spacing of the fixed contact with respect to the adjacent one. In this way, the sequence of breaking of electrical connection between each pair of fixed and movable contacts may be modified, the degree of movement of the finger lifting member 66 necessary to open a given contact pair may be adjusted, and the tension exerted by the resilient movable contact fingers 160 on the finger lifting member 66 may be controlled. Hence, calibration of the assembled regulator in order to achieve desired results or uniformity of operation is rendered exceedingly simple.

Both the fixed and movable contacts may be formed in a highly economical manner since sheet stock is used for both, since the same sheet stock is used for both, and since only a minor proportion of sheet stock is wasted. By forming each of the contact sets in the form of a comb having connecting portions 148, or 150, the contact sets are rendered easily manipulatable since in a single motion of an individual the entire contact set is placed in position on the unit as it is being assembled. In the case of one of the contact sets, here shown as the fixed contact set 16, by way of example, the connecting portion 150 also provides a common electrical connection between each of the contacts 16. By providing the individual contacts of the other contact set, here shown as the fingers 160 of the second comb, with individual apertures 154, these contacts may be individually secured to the mounting plate 14 while they are all maintained in accurate alignment one with the other by virtue of their common physical connection with the connecting portion 148. Thereafter, the connecting portion 148 may be removed so that the contacts are each separated from the other physically and electrically.

By using a comb of flexible conductive material in place of the usual multiplicity of individual wires, soldering operations on the electrically separated contacts 160 are completely eliminated and, indeed, all additional operations leading to the attainment of electrical connection are avoided. By the self same eyeleting operation which secures the fingers 160 to the mounting plate 14, the electrical leads are connected thereto. These leads may then be led to the appropriate prongs 4 and there secured in conventional manner.

The component construction thus attained is not only simple, inexpensive, and capable of easy adjustment, all as have been pointed out heretofore, but is also light, compact, and exceedingly accurate. It is felt that this construction plays a large part in the overall design of the regulator, permitting the attainment of such lightness, low cost, and ruggedness as to cause it to perform equally to or better than prior regulators either of the finger type or of other types under extremely adverse conditions, particularly insofar as vibration and accelerative forces are concerned. The thickness of the fingers 160 (and also of the fingers 158) is very slight, on the order of .005 of an inch. This not only makes for inexpensiveness since but little material is employed, but it also gives rise to an extremely sensitive contact assembly having such high resonant frequency as to be unaffected by all but the most abnormal vibration.

It will be apparent that many changes may be made in the method and construction herein described without departing from the spirit of my invention as defined in the following claims.

I claim:

1. A contact assembly for a circuit regulator comprising a mounting plate, a set of fixed contacts secured to said plate, a common conductor connecting said fixed contacts, a plurality of electrically separated resilient movable contacts, one for each fixed contact, each fastened at one end to said plate and resiliently bearable at its other end against a fixed contact, and a plurality of flexible conductive strips, each secured to said plate and to a movable contact at the same point and by the same means as said plate and movable contact are secured to one another, said conductive strips serving as leads making electrical connection with said movable contacts.

2. A contact assembly for a circuit regulator comprising a mounting plate, a set of fixed contacts secured to said plate, a common conductor connecting said fixed contacts, a plurality of electrically separated resilient movable contacts, one for each fixed contact, each having a contact engaging portion and an aperture separated therefrom, a plurality of flexible conductive strips, each having an aperture, the apertured portions of said movable contacts and said conductive strips overlying one another with the apertures in registration, and rivets passing through said aligned apertures and securing said contacts and strips to said plate, said conductive strips serving as leads making electrical connection with said movable contacts.

3. A contact assembly for a circuit regulator comprising a mounting plate, an integral metal sheet secured to said plate and having physically separated upbent portions defining fixed contacts, and a plurality of electrically separated resilient fingers, one for each fixed contact, one portion of said fingers resiliently bearable against a fixed contact and another portion secured to said plate.

4. The contact assembly of claim 3, in which said upbent portions are manually bendable, whereby the alignment of said movable contacts may be adjusted.

5. A contact assembly for a circuit regulator comprising a mounting plate, an integral metal sheet secured to said plate and having physically separated upbent portions defining fixed contacts, a plurality of electrically separated resilient movable contacts, one for each fixed contact, each fastened at one end to said plate and resiliently bearable at its other end against a fixed contact, and a plurality of flexible conductive strips, each secured to said plate and to a movable contact at the same point and by the same means as said plate and movable contact are secured to one another, said conductive strips serving as leads making electrical connection with said movable contacts.

6. A contact assembly for a circuit regulator comprising a mounting plate, an integral metal sheet secured to said plate and having physically separated upbent portions defining fixed contacts, a plurality of electrically separated resilient movable contacts, one for each fixed contact, each having a contact engaging portion and an aperture separated therefrom, a plurality of flexible conductive strips, each having an aperture, the apertured portions of said movable contacts and said conductive strips overlying one another with the apertures in registration, and rivets passing through said aligned apertures and securing said contacts and strips to said plate, said conductive strips serving as leads making electrical connection with said movable contacts.

7. The contact assembly of claim 6, in which said upbent portions are manually bendable, whereby the alignment of said movable contacts may be adjusted.

8. A plug-in type circuit regulator comprising a housing, plug-in prongs, the contact assembly of claim 1, and means for sequentially separating said fixed and movable contacts, the free ends of said conductive strips and said common conductor being secured to appropriate ones of said prongs.

9. A plug-in type circuit regulator comprising a housing, plug-in prongs, the contact assembly of claim 2, and means for sequentially separating said fixed and movable contacts, the free ends of said conductive strips and said common conductor being secured to appropriate ones of said prongs.

10. A plug-in type circuit regulator comprising a housing, plug-in prongs, the contact assembly of claim 5, and means for sequentially separating said fixed and movable contacts, the free ends of said conductive strips and said common conductor being secured to appropriate ones of said prongs.

11. A plug-in type circuit regulator comprising a housing, plug-in prongs, the contact assembly of claim 6, and means for sequentially separating said fixed and movable contacts, the free end of said conductive strips and said common conductor being secured to appropriate ones of said prongs.

12. An electrical contact and connector assembly comprising a mounting plate, a plurality of electrically separated contacts each having a contact engaging portion and an aperture separated therefrom, a plurality of flexible conductive strips, each having an aperture, the apertured portions of said contacts and said conductive strips overlying one another with the apertures in registration, and rivets passing through said aligned apertures and securing said contacts and strips to said plate, said conductive strips serving as leads making electrical connection with said contacts.

13. A contact assembly for a circuit regulator comprising a mounting plate, a set of fixed contacts secured to said plate, a set of resilient movable contacts secured to said plate, the contacts of one of said sets being electrically separated and the contacts of the other of said sets being electrically connected by a common conductor, and a plurality of flexible conductive strips, each secured to said plate and to a contact of said one of said contact sets at the same point and by the same means as said plate and said contact are secured to one another, said conductive strips serving as leads making electrical connection with said movable contacts.

14. A contact assembly for a circuit regulator comprising a mounting plate, a set of fixed contacts secured to said plate, a set of resilient movable contacts secured to said plate, the contacts of one of said sets being electrically separated and each having an aperture and the contacts of the other of said sets being electrically connected by a common conductor, and a plurality of flexible conductive strips each having an aperture, the apertured portion of said conductive strips and the apertured portion of the contacts of said one of said contact sets overlying one another with the apertures in registration, and rivets passing through said aligned apertures and securing said contacts and said strips to said plate, said conductive strips serving as leads making electrical connection with said movable contacts.

15. A contact assembly for a circuit regulator comprising a mounting plate, physically separated bendable metal strips secured to said plate and upbent therefrom to define a set of fixed contacts, a set of physically separated resilient movable contacts, one for each fixed contact, a common conductor electrically connecting one of said sets of contacts, the contacts of said other set of contacts each having a contact engaging portion and an aperture separated therefrom, and a plurality of flexible conductive strips each having an aperture, the apertured portions of said conductive strips and of the contacts of said other set of contacts overlying one another with the apertures in registration, and rivets passing through said aligned apertures and securing said contacts and strips to said plate, said conductive strips serving as leads making electrical connection with said movable contacts.

ARTHUR M. COHEN.

References Cited in the file of this patent

UNITED STATES PATENTS

| Number | Name | Date |
|---|---|---|
| 773,931 | Perow | Nov. 1, 1904 |
| 1,105,489 | Clement | July 28, 1914 |
| 1,334,276 | Adams | Mar. 30, 1920 |
| 1,693,173 | Brown | Nov. 27, 1928 |
| 1,840,997 | Yeager | Jan. 12, 1932 |
| 1,905,690 | Doyle | Apr. 25, 1933 |
| 2,006,417 | Topping | Jan. 2, 1935 |
| 2,127,648 | Mehlhouse | Aug. 23, 1938 |
| 2,302,571 | Ray | Nov. 17, 1942 |
| 2,342,552 | Mallina | Feb. 22, 1944 |